United States Patent [19]

Drerup

[11] Patent Number: 5,333,285

[45] Date of Patent: Jul. 26, 1994

[54] SYSTEM CRASH DETECT AND AUTOMATIC RESET MECHANISM FOR PROCESSOR CARDS

[75] Inventor: Bernard C. Drerup, Austin, Tex.

[73] Assignee: International Business Machines Corporation, Armonk, N.Y.

[21] Appl. No.: 795,562

[22] Filed: Nov. 21, 1991

[51] Int. Cl.$^5$ .............................................. G06F 11/14
[52] U.S. Cl. .................................... 395/575; 371/16.3
[58] Field of Search ............................. 371/16.3, 16.1; 395/575

[56] References Cited

U.S. PATENT DOCUMENTS

| | | | |
|---|---|---|---|
| 4,093,823 | 6/1978 | Chu | 371/33 |
| 4,760,553 | 7/1988 | Buckley et al. | 395/575 |
| 4,817,092 | 3/1989 | Denny | 371/11 |
| 4,873,687 | 10/1989 | Breu | 371/8.2 |
| 4,912,708 | 3/1990 | Wendt | 371/16.3 |
| 5,023,779 | 6/1991 | Federico et al. | 395/575 |
| 5,084,871 | 1/1992 | Carn et al. | 371/33 |

OTHER PUBLICATIONS

IBM TDB "Software-Controlled Watchdog and Reboot Circuit Device for Personal Systems," vol. 31, No. 12, May 1989, pp. 374–375.

IBM TDB "Automatic Hardware Detection of Personal Computer Software System Resets and Re-Initial Program Load," Jan. 1989, pp. 162–164.

Primary Examiner—Charles E. Atkinson
Attorney, Agent, or Firm—Mark E. McBurney

[57] ABSTRACT

A hardware and software mechanism is provided for ensuring that a feature processor card, included with other feature cards in a host system, can be reset without interrupting software running on other feature cards. A delay is provided that starts counting each time a watchdog timer expires. If the watchdog timer is reset by an interrupt service routine, then the feature card processor is assumed to be reset. But, if the watchdog timer is not reset before the delay timer expires, then it is assumed that service routine is corrupt and that external reset of the feature card is required. Upon expiration of the watchdog, an error signal is sent, via the system bus, to the host CPU. Recovery code that is resident on the host CPU is then run and resets the CPU on the feature card. A reset signal is output from the host CPU, via the system bus, to a reset register on the feature card which then forwards the signal to the feature card CPU, thereby initiating reset of the system.

14 Claims, 5 Drawing Sheets

SYSTEM CRASH DETECT AND AUTOMATIC RESET MECHANISM FOR PROCESSOR CARDS

BACKGROUND OF THE INVENTION

1. Field of the Invention

This invention generally relates to the individual reset of one of a plurality of processor cards installed on a host system, or a server. More particularly, an individual workstation consisting of a processor card that is physically located in a host machine with a plurality of other processor cards, each using a particular software operating system, can be reset without adversely affecting the operations of other workstations or the host system.

2. Description of Related Art

Generally, IBM and IBM compatible computers, such as the PS/2 (PS/2 is a trademark of IBM Corporation) use a CTRL-ALT-DEL (Control-Alternate-Delete) keyboard sequence to reset the system, typically after the software crashes, for reasons such as defective application program software, or the like. However, on some occasions a software crash will occur in such a way that the CTRL-ALT-DEL sequence cannot be serviced by a reset routine and the only method of resetting the system is to turn the machine off and then on again.

It is known that multiple feature cards, each having their own processor, can be installed in a computer that is configured as a host machine. Each of the feature cards will independently run an operating system on its processor and support a separate user. Thus, it can be seen that if the feature card crashes and the standard CTRL-ALT-DEL sequence fails to reset the system, the user needs another means of resetting the feature card processor. The user cannot utilize another terminal in the system to reset the crashed card, since all other terminals may be in use. Further, the entire host machine cannot be powered off and then on again, since all of the programs being run by other users on the system would be reset. A special reset switch could be hardwired from each terminal to the corresponding feature card, but this would make the terminal equipment, i.e. keyboard, display, and the like non-standard and thus incompatible with equipment from other manufacturers. Similarly, a special switch installed on the host machine, corresponding to each feature card, is unacceptable since users are likely to be in a different room than the host machine, and the switches may be in an inconveniently accessed physical location on the host box.

Therefore, it can be seen that a mechanism for reliably resetting, after a software crash, an individual feature card corresponding to a particular terminal, and which is contained in a host machine having multiple feature cards is very desirable. In particular, a mechanism is needed that will reset only the feature card that has crashed, without resetting any of the other cards contained in the host all of which may be running program applications for other system users.

SUMMARY OF THE INVENTION

In contrast to the prior art, the present invention provides an external reset mechanism to restore the feature card after a software crash. As stated above, it is possible that the CTRL-ALT-DEL keyboard sequence will not reset the system on the feature card. Therefore, a timer, buffer and reset register are provided on the feature card and utilized along with appropriate software on the host machine and the feature card to ensure the reset of each individual feature card.

Broadly, each feature card (which is essentially a self contained personal computer) includes a watchdog timer that counts when the system timer goes unserviced. The system timer is used by the operating system for various functions, such as timekeeping, task switching, and the like. These functions are performed when the system timer expires and sends an interrupt to its associated CPU. However, if this interrupt goes unserviced, then the watchdog timer expires. Since, the system timer is the highest priority interrupt to the local CPU on the feature card, it is assumed that the system may have crashed if the system timer goes unserviced. Normally, when the watchdog timer expires an interrupt is output to drive a non-maskable interrupt (NMI) reset service routine on the local (feature card) CPU. This NMI routine can check the keyboard for a CTRL-ALT-DEL sequence. If the CTRL-ALT-DEL is not detected it is assumed that the NMI routine was falsely invoked (since a user will normally input the CTRL-ALT-Delete sequence if a system crash has actually occurred) and the watchdog timer is reset and the NMI routine ends. If CTRL-ALT-DEL is detected then a soft reset is initiated by invoking the system initialization routine, such as the power on self test (POST).

However, if the feature card has in fact crashed it is possible that the NMI service routine is corrupted and an external reset mechanism must be available, since powering the host machine off, and then on, is not possible due to the presence of multiple users.

This external reset mechanism includes a delay timer that starts counting each time the watchdog timer expires. When the watchdog timer expires it may be reset by the NMI service routine, in which case the feature card processor is assumed to have been running properly. But, if the watchdog timer is not reset before the delay period expires, then the NMI service routine may be corrupt and external reset of the feature card is required. Upon expiration of the watchdog, an error signal is sent via the system bus, to the host CPU. Recovery code that is resident on the host CPU is then run which resets the CPU on the feature card. A reset signal is output from the host CPU, via the system bus, to a reset register on the feature card which then forwards the reset signal to the feature card CPU, thereby initiating reset of the system.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
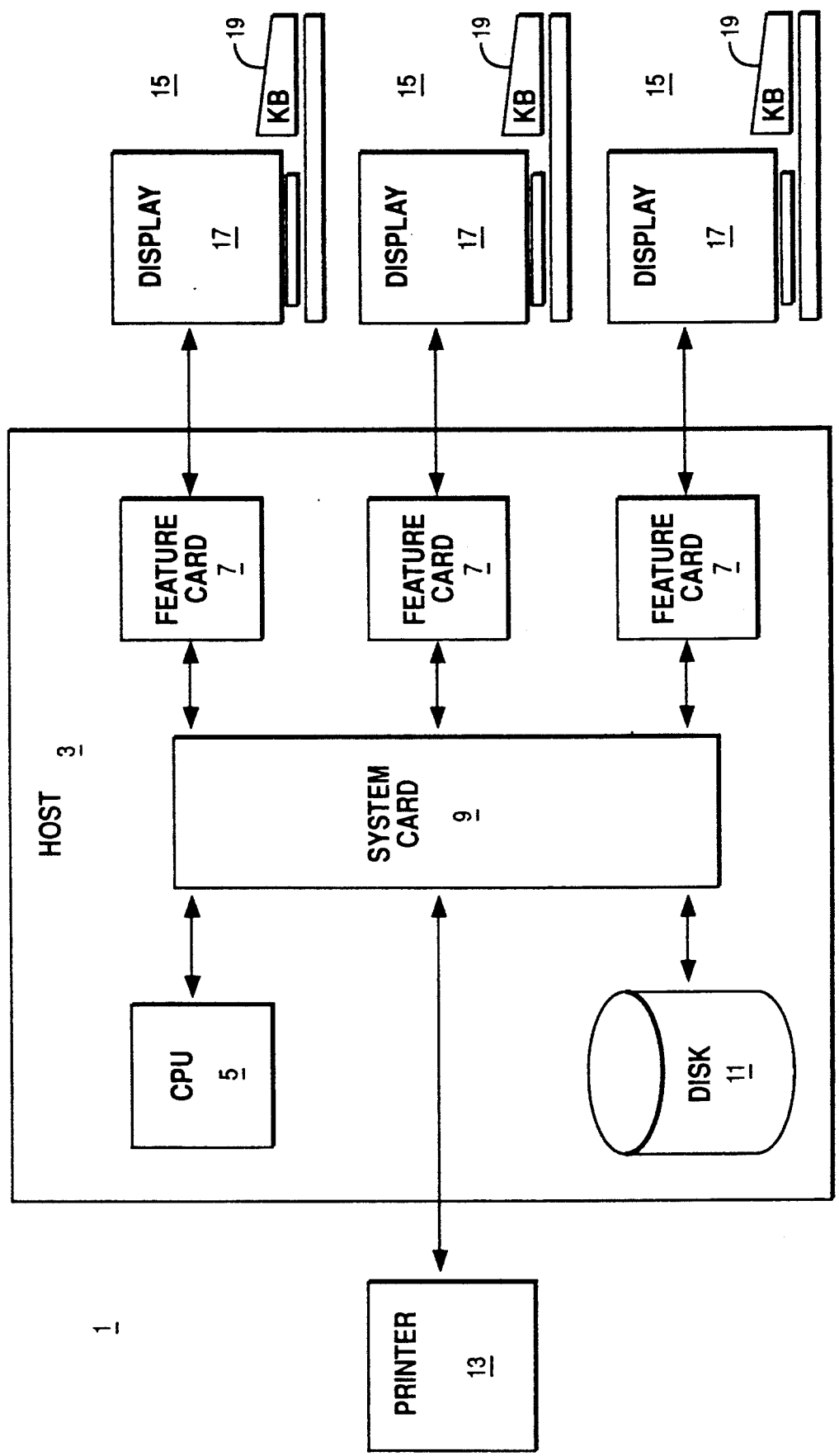
FIG. 1 is a block diagram showing the host machine having plural feature cards therein and associated user terminals.

Referring to FIG. 1, a multiple user system is shown and noted by reference numeral 1. A host computer 3 is shown which may be any of a number of commercially available computers such as a PS/2 system, or the like. Host computer 3 includes central processing unit 5 which may be one of the Intel X86 family of microprocessors. Feature cards 7 are also included Withill host 3 and will be described further with reference to FIGS. 2 and 4. It should be noted that feature cards 7 are insertable and electrically connectable into host computer 3 via expansion slots, or the like. Additionally, it should be understood that while three feature cards 7 are shown for exemplary purposes, any number of feature cards can be used and are contemplated by the scope of the present invention. A system card 9 is provided and includes a bus interface that may be the Microchannel bus, utilized by the IBM Corporation (Microchannel is a trademark of the IBM Corp.). Peripheral devices are also included within the host system 3 and connected to system card 9 and may include a memory device 11 such as a disk storage device, e.g. a floppy type disk or a hard drive. Additionally, a printer 13 is shown and may be provided as part of the host system. Further, it should be noted that other input/output (I/O) peripheral devices, such as a keyboard and display (not shown) can be utilized and interconnected with the host system 3 if desired. Also shown in FIG. 1, are plural workstations 15 which may include a display 17, keyboard 19 and other peripheral devices, such as a mouse, floppy disk drive, serial port, or the like. Again, three workstations 15 are shown, but it is to be understood that any number of plural workstations 15 are contemplated by the present invention. It also can be seen from viewing FIG. 1, that each workstation 15 is associated with a corresponding one of feature cards 7 located in host system 3. Generally, feature card 7 will include a microprocessor, e.g. one of the Intel X86 microprocessors such that workstations 15 in conjunction with a corresponding feature card 7 are essentially equivalent to a stand alone personal computer system. It can be seen that in an office or business environment, having a single host computer with plural feature cards and peripheral devices, associated with the feature cards, will utilize economies of scale and other efficiencies to provide advantages for customers desiring the use of multiple personal computer systems. Of course, the cost of a single host computer and plural peripheral devices, i.e. displays and keyboards will be less than a corresponding number of individual personal computer systems. Therefore, it can be seen why a system such a shown in FIG. 1 is extremely desirable, and it will be further explained below why the present invention is needed to provide reset functions for each feature card 7 independently in order to allow the most efficient use of host system 3.

Figure 2:
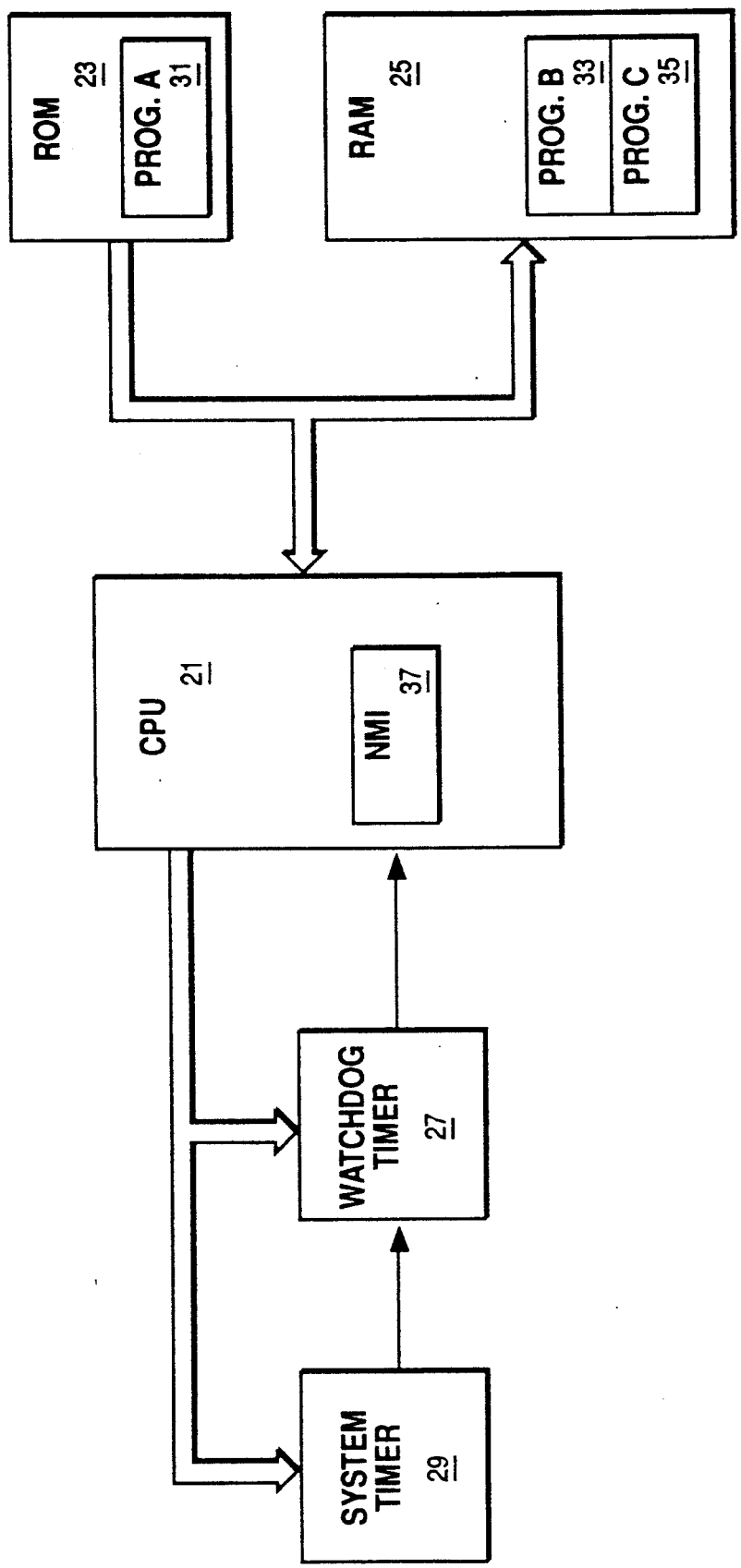
FIG. 2 is a schematic diagram of the components of a standard feature card.

FIG. 2 shows a standard feature card which is configured as an IBM PS/2 system without the benefit of the present invention. It can be seen that a central processing unit 21 is provided, again such as the Intel X86 series of microprocessors. A read only memory (ROM) 23 and random access memory (RAM) 25 are also provided and interconnected with CPU 21. A system timer 29 is provided which is the highest priority interrupt to the CPU 21. The system timer 29 is used by the operating system for various functions, such as timekeeping, task switching, and the like. These functions are performed when the system timer expires and sends an interrupt to its associated CPU 21. Additionally, a watchdog timer 27 is provided which counts when the system timer 29 does not get serviced within one of its clock periods. Thus, when system timer 29 expires, a signal is input to watchdog timer 27. Watchdog timer 27 monitors this input from the system timer for an indication that the system timer has been cleared. If the system timer is not cleared (goes unserviced), then watchdog timer 27 expires and it is assumed, that the system has crashed and watchdog timer 27 outputs an interrupt (error) signal to the NMI signal input 37 of CPU 21 which then invokes a non-maskable interrupt (NMI) reset routine (program 35) that can reset the system. Additionally, ROM 23 includes a program 31 (A) which is an initialization program. RAM 25 includes program 33 (B) which is an application program, or an operating system that runs under normal conditions. RAM 25 also includes program 35 (C) which is the NMI interrupt routine that is run when the NMI 37 signal is triggered by watchdog timer 27. Memory 25, NMI program 35 and initialization program 31 may be considered as part of an internal reset system of feature card 7.

Figure 3:
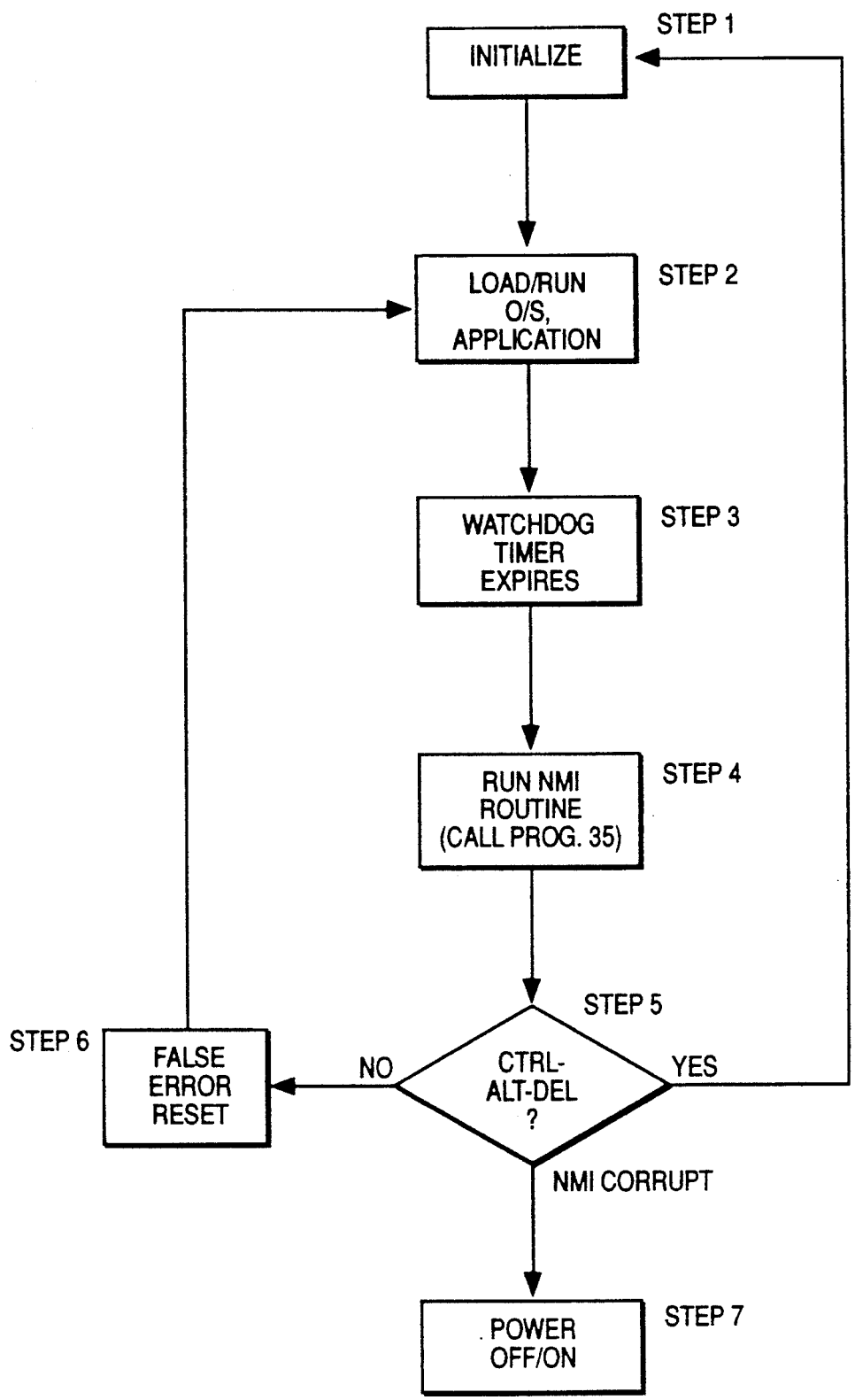
FIG. 3 is a flow chart of the steps representing the software function required to reset the feature card CPU of FIG. 2.

FIG. 3 is a flowchart showing the normal reset steps utilized by feature card 7 or system card 9, shown in FIGS. 1 and 2. At step 1 the system is initialized by powering the machine on, to invoke initialization program 31 which may be a power on self test (POST) routine. At step 2, program 31 loads programs 33 and 35 into system memory and runs program 33 which is the normal implementation of the operating system or a program application. Under normal operation, program 33 will then continue running until the user logs off or the machine is powered off. However, at step 3, the watchdog timer 27 expires due to a problem in program 33, or the like and a signal is output to CPU 21 triggering NMI interrupt routine 35. At step 4, the non-maskable interrupt routine 35 is run by CPU 21. Program 35 (NMI interrupt routine) then determines whether the user has input the keyboard sequence Control-Alt-Delete and if so the flowchart returns to step 1 and the system is reinitialized by running program 31. It is assumed that if a problem has occurred in program 33 the user will in fact input the keyboard sequence Control-Alt-Delete. Therefore, if it is determined at step 5 that Control-Alt-Delete has not been input by the user, then step 6 considers the error to be false and the flowchart returns to step 2 where program 33 is continued. However, in the case of a system crash, it is possible for the NMI reset routine to be corrupted such that program 35 is not invoked and the presence, or absence, of the Control-Alt-Delete keyboard sequence cannot be determined. In this case, the NMI routine is corrupt and no programs can be properly executed. The conventional solution is to power the machine off and on. However, as previously noted, this alternative is not possible when utilizing a host system of plural feature cards such as is shown by FIG. 1.

Figure 4:
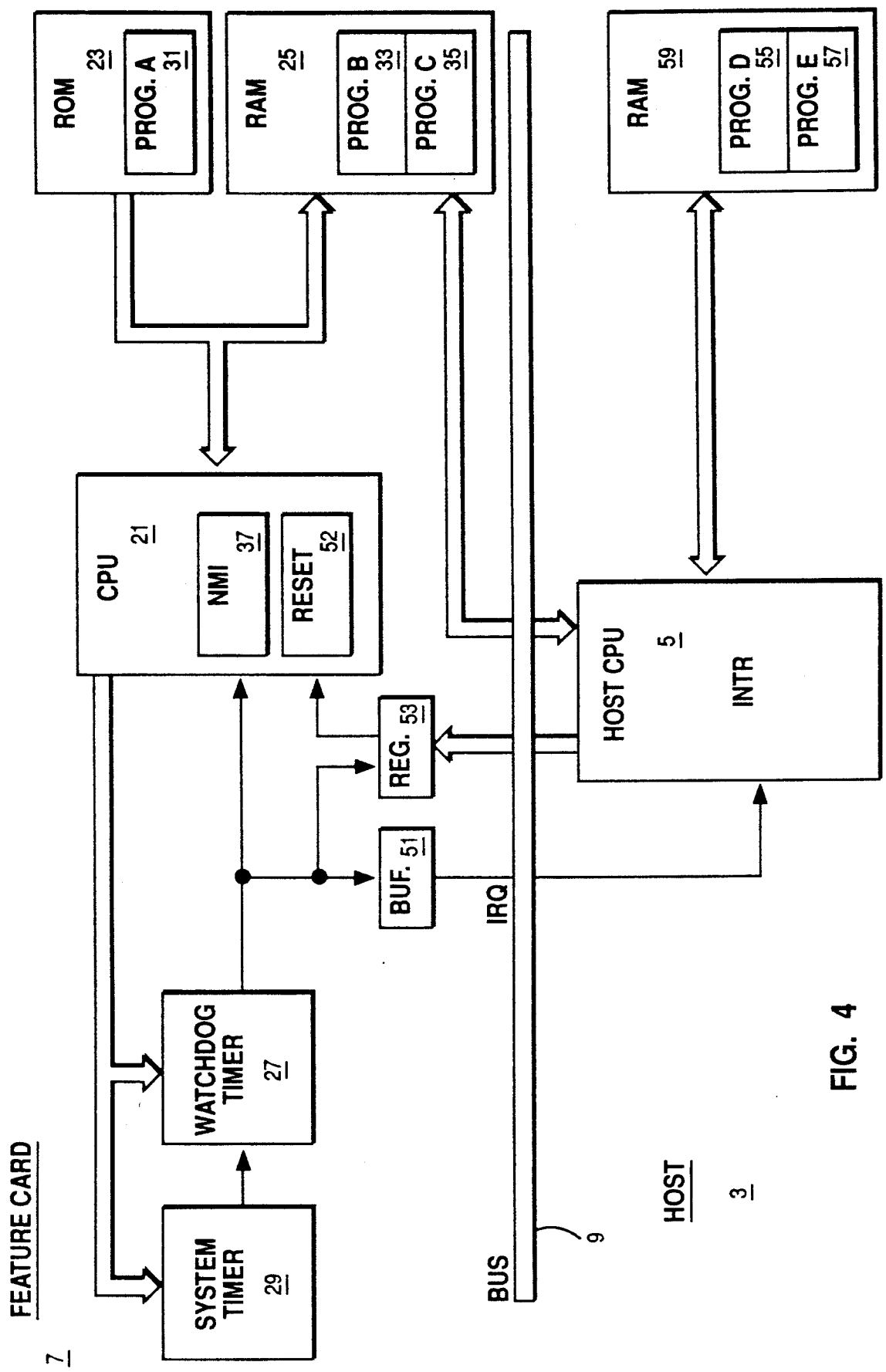
FIG. 4 is a schematic diagram showing the present invention including its components and interconnection with the host CPU.

Referring to FIG. 4, hardware components and interconnections therebetween of feature card 7 of the present invention and host system 3 are shown. It should be noted that like reference numerals refer to identical components, as previously described with reference to FIGS. 1 and 2. It can be seen that feature card 7 communicates with host 3 through bus 9. A buffer 51 and register 53 have been added to feature card 7 along with wiring changes required to implement the present invention. Further, a reset input 52 is shown within CPU 21 and will be described below in conjunction with the operation of the present invention. It can be seen from FIG. 4, that upon expiration of watchdog timer 27 an error signal is output not only to the NMI input 37 of CPU 21 but also to buffer 51 and register 53. The watchdog timer signal is then output as an interrupt request signal (IRQ) through bus 9 and input as an interrupt to host CPU 5. RAM 25 of feature card 7 is also connected with host CPU 5 via bus 9. CPU 5 may also output signals to register 53 of feature cards 7, which are ultimately input to reset input 52 of feature card CPU 21. A host random access memory 59 is also provided and shown connected with CPU 5. RAM 59 includes a program 57 (E) which is an application program or operating system that runs under normal conditions. Program 55 (D) is an interrupt service routine which is executed when an interrupt is received by host CPU 5 through buffer 51.

Figure 5:
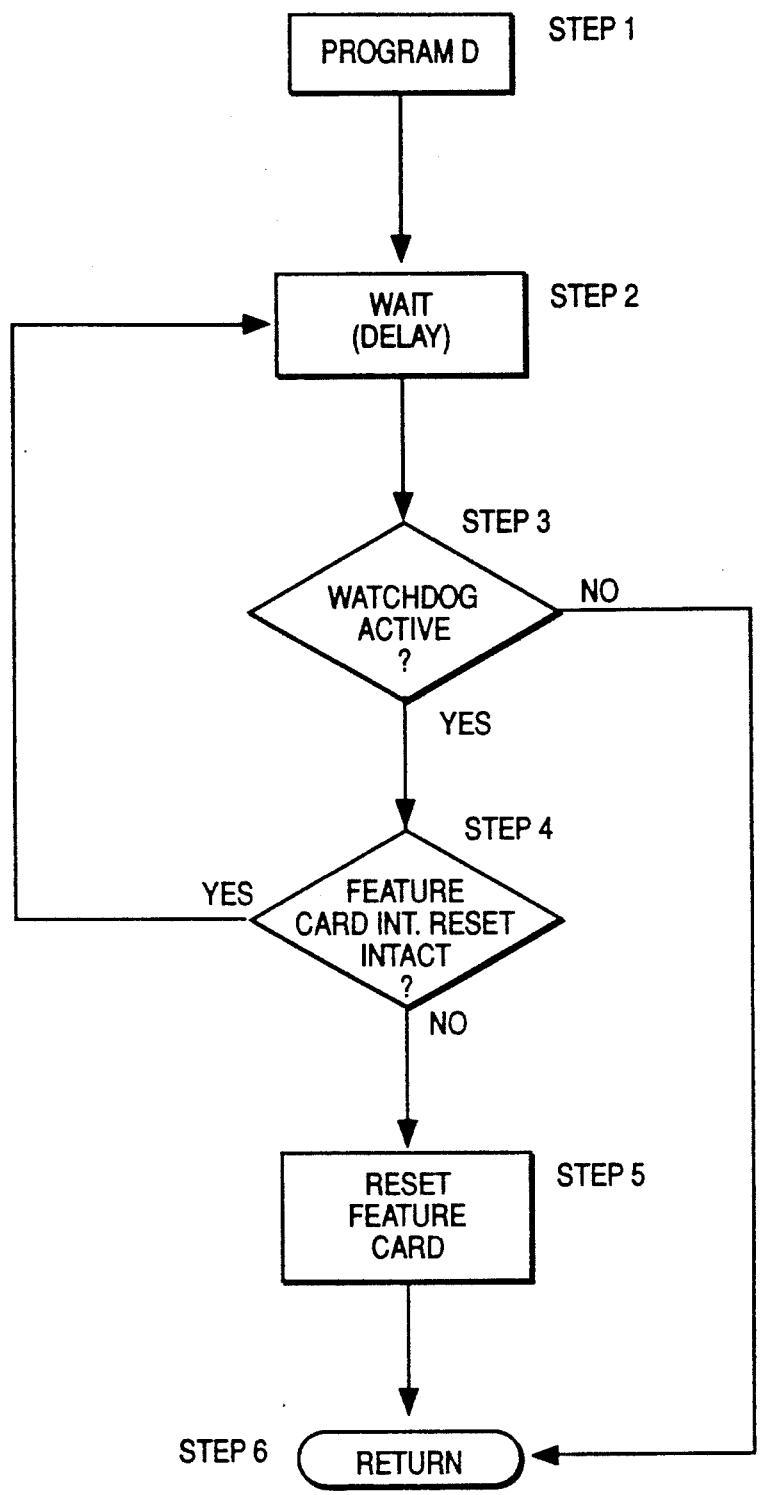
FIG. 5 is a flow chart showing the functionality added to the multiprocessor system by the present invention.

The operation of the present invention will now be described with reference to FIG. 5, as well as FIG. 4. At step 1, of FIG. 5, program 55 is invoked which assumes that watchdog timer 27 has expired and error signals have been input to CPU 21, buffer 51 and register 53. Buffer 51 outputs an interrupt request to host CPU 5 which then interrupts the normal operation of program 57 and begins the service routine program 55. At step 2, a delay mechanism is implemented such that program 55 waits for a period of time to ensure that the NMI driver program 35 is given ample opportunity to reset CPU 21, as previously discussed with regard to FIGS. 2 and 3. In a preferred embodiment, this delay mechanism is implemented as a software timer, built into program 55. After an appropriate length of time, which is approximately 1.0 second, program 55 checks to see if the watchdog timer 27 is still active. This step is accomplished by host CPU 5 reading register 53 to check for the presence of the signal from the watchdog timer 27 (FIG. 4). If the watchdog timer is not active, i.e. a signal is not present in register 53, then the present invention assumes program 35 was successful in resetting CPU 21 or that program 35 determined the error to be false and the process returns to the normal operation of program 57. However, if it is determined at step 3 that the watchdog timer 27 has remained active, then the process continues to step 4 wherein an integrity check is performed on the internal reset system, i.e. the validity of the memory and NMI routine is determined, of the feature card 7. In particular, CPU 5 checks for the integrity of RAM 25 and in particular whether program 35 has been corrupted (invalid). If the validity check shows that RAM 25 and program 35 are intact, or valid, then the process of FIG. 5 returns to step 2 wherein the time delay is again implemented prior to checking register 53 for the presence of the reset signal that will indicate whether the watchdog timer is active. It will be understood by those skilled in the art that this integrity check can be performed using any one of a number of known techniques. For example, bit parity checking the code of the NMI routine 35 (i.e. checksum) can be utilized. Additionally, maintaining a true copy of the NMI software code in host CPU 5 and performing a comparison with the NMI code in feature card 7 will provide an integrity check. It should be noted that the process of the present invention will return to step 2 (from step 4) for various reasons, such as the delay period being not long enough for the watchdog being reset. If at step 4, it is determined that RAM 25 and program 35 are not intact, i.e. they are corrupted, then at step 5 program 55 resets CPU 21 of feature card 7. This is accomplished by CPU 5 outputting a reset signal to register 53 which in turn outputs the reset signal to CPU 21 at reset input point 52. CPU 21 then begins normal initialization operations, i.e. program 31 is run. Subsequent to reset of the feature card, the process of FIG. 5 then continues to step 6 where control of the host CPU is returned to program 57 and normal operations continue.

Thus, it can be seen that the present invention allows single feature cards running in a host system, with a plurality of other feature cards, to be individually reset even when the non-maskable interrupt routine 35 and RAM 25 are corrupt. Conventionally, when the NMI routine 35 and the RAM 25 are corrupt, powering the machine off and then on is used as the reset tool. However, with the present invention the CPU 21 of the feature card can be reset even during a normally unrecoverable error, thereby ensuring the integrity of programs running on the plurality of other feature cards 7 included within host system 3.

It should also be noted that the complexity of the reset mechanism of the present invention is due to the large variety of software, that will run on personal computers (e.g. feature cards 7), which can cause the watchdog timer to expire under normal operations. If it is desired to minimize the sequence of checks that occur before resetting the feature card CPU 21, the type of software supported by the present invention can be limited.

Although certain preferred embodiments have been shown and described, it should be understood that many changes and modifications may be made therein without departing from the scope of the appended claims.

What is claimed is:

1. A method of resetting one of a plurality of feature cards, each having a central processing unit, that are included within a host machine, said method comprising:
    running an external reset routine when an error signal is output from one of said feature cards;
    determining the validity of an internal reset system within said one of said feature cards; and
    externally resetting said feature card by outputting a reset signal from said host machine when said internal reset system is determined to be invalid.

2. A method according to claim 1 wherein said step of running comprises monitoring, by a processor within said host machine, said feature card for the presence of said error signal.

3. A method according to claim 2 wherein said step of running further comprises:
    waiting for a predetermined period of time to ensure that said internal reset system has an opportunity to reset said feature card; and
    checking for the presence of said error signal, after said predetermined period of time has ended.

4. A method according to claim 3 wherein said step of determining further comprises performing a validity check on said internal reset system, when said error signal is present.

5. A method according to claim 4 wherein said internal reset system comprises a memory, reset program and initialization program.

6. A method according to claim 5 wherein said step of determining comprises returning said feature card to normal operation, subsequent to said step of checking, when said error signal is absent.

7. A method according to claim 6 wherein said step of externally resetting comprises outputting said external reset signal from said host processor which causes said feature card to run said initialization program and reset said feature card central processing unit.

8. A system for resetting one of a plurality of feature cards, each having a central processing unit, that are included within a host machine, comprising:
means for running an external reset routine when an error signal is output from one of said feature cards;
means for determining the validity of an internal reset system within said one of said feature cards; and
means for externally resetting said feature card when said internal reset system is determined to be invalid.

9. A system according to claim 8 wherein said means for running comprises:
means, within said feature card, for receiving said error signal; and
a central processing unit within said host machine capable of reading said receiving means for the presence of said error signal.

10. A system according to claim 9 wherein said means for running further comprises:
delay means for waiting a predetermined period of time to provide said internal reset system an opportunity to reset said feature card; and
means for reading said receiving means for the presence of said error signal, after said predetermined period of time has ended.

11. A system according to claim 10 wherein said means for determining performs a validity check when said error signal is present in said register.

12. A system according to claim 11 wherein said internal reset system comprises a memory, a reset program and an initialization program.

13. A system according to claim 12 wherein said means for determining further comprises means for returning said feature card to normal operation, subsequent to reading said receiving means, when said error signal is absent.

14. A system according to claim 13 wherein said external reset means comprises means for outputting a reset signal from said host processor which causes said feature card to run said initialization program and reset said feature card central processing unit.

* * * * *